J. W. HUDSON.
EGG BEATER.
APPLICATION FILED JULY 14, 1914.

1,192,426.

Patented July 25, 1916.
2 SHEETS—SHEET 1.

Witnesses
Edw. S. Hall.
W. E. Valk Jr.

Inventor
James W. Hudson.
By Richard B. Owen.
Attorney

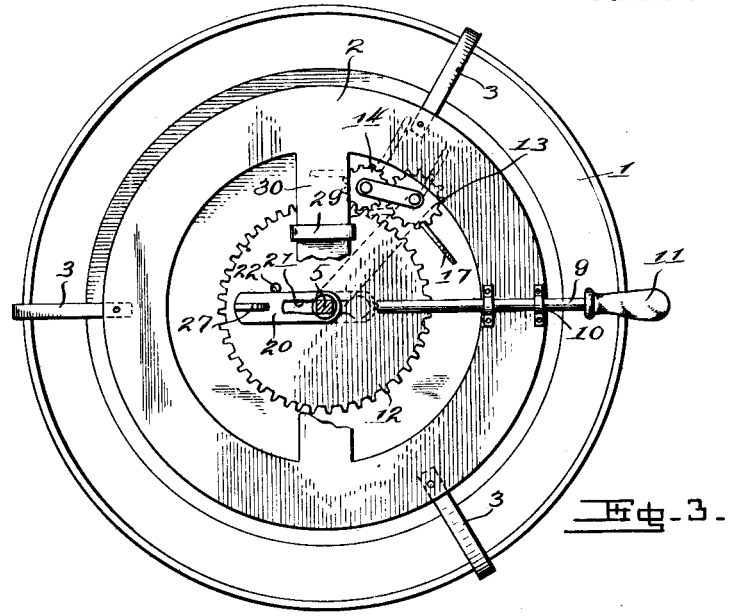
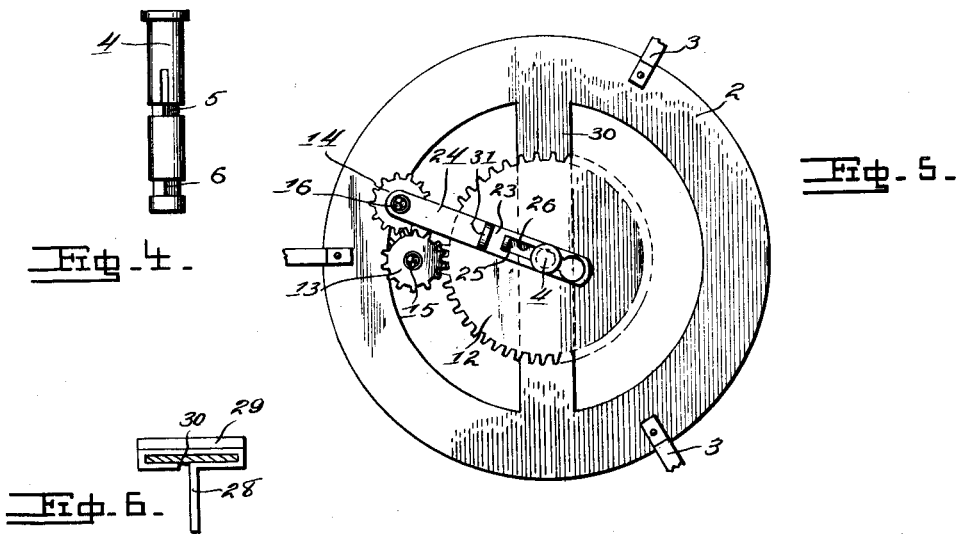

UNITED STATES PATENT OFFICE.

JAMES W. HUDSON, OF SEATTLE, WASHINGTON.

EGG-BEATER.

1,192,426.  Specification of Letters Patent.  Patented July 25, 1916.

Application filed July 14, 1914. Serial No. 850,973.

*To all whom it may concern:*

Be it known that I, JAMES W. HUDSON, citizen of the United States, residing at Seattle, in the county of King and State of Washington, have invented certain new and useful Improvements in Egg-Beaters, of which the following is a specification.

My invention relates to an improved egg beater wherein means is provided to simultaneously rotate suitable beating devices in alternate directions, at the same time, if desired, bodily moving the said devices, while rotating, in the path of a circle, first in one direction, and then in the other, to in this manner effectually beat the contents of the receptacle within which the beating devices are arranged.

In describing my invention in detail reference will be had to the accompanying drawings wherein like characters denote like or corresponding parts throughout the several views, and in which:—

Figure 1:
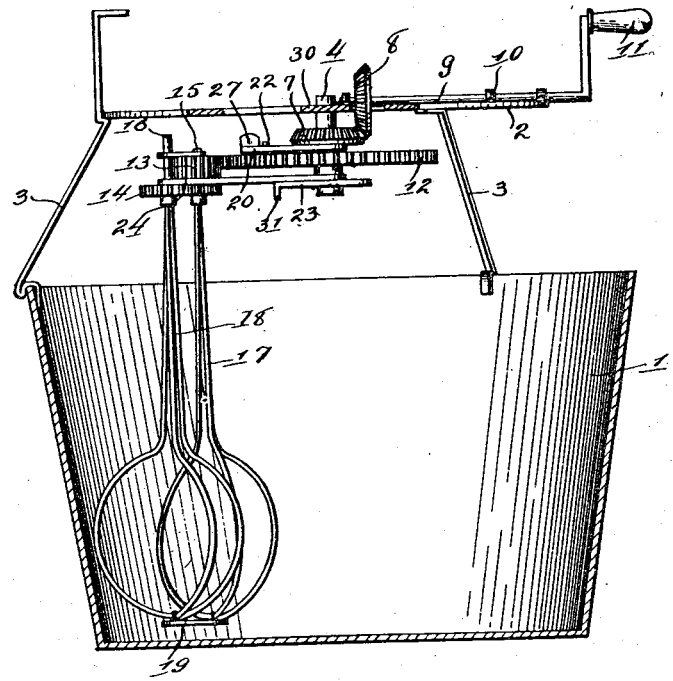
Figure 2:
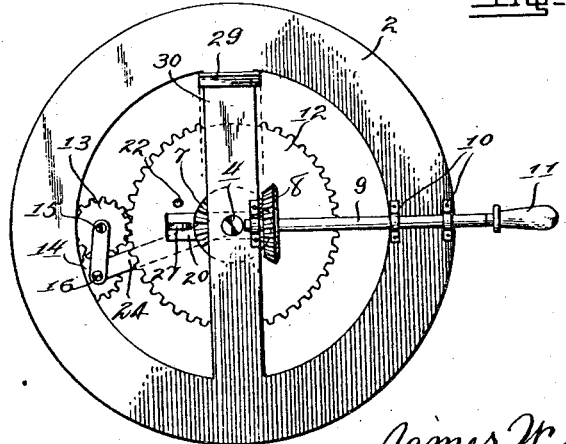

Figure 1 is a longitudinal sectional view of the receptacle illustrating the arrangement of the beating devices and operating mechanism therefor; Fig. 2 is a top plan view of the device as illustrated in Fig. 1, the receptacle being undisclosed; Fig. 3 is a view similar to Fig. 2, parts being broken away, parts being shown in section, and the receptacle shown in full; Fig. 4 is an enlarged elevation of the operating shaft or spindle; Fig. 5 is an inverted plan view of the device as disclosed in Fig. 2; and Fig. 6 is a fragmentary sectional view illustrating the manner in which the stop device is arranged to slide relatively to the supporting plate for the operating means.

Before proceeding with the description of the drawings, I desire to call particular attention to the fact that while I have evolved my invention with reference to its application as an egg beater, the same may be readily utilized, if desired, as a cream whip, mixer, or for various other purposes where beating devices are utilized as a stirring or mixing means.

Referring now to the drawings by numerals, 1 designates the receptacle in connection with which the beater is used.

In its preferred embodiment, the beater consists of a suitable supporting plate 2 disposed in a plane, preferably above the top edge of the receptacle; specially shaped arms 3 being utilized as a supporting means for the plate, the arms, as shown to advantage in Fig. 1, being directly engageable with the receptacle, particularly to the top edge thereof.

Disposed concentrically relatively to the plate 2, the latter serving as a bearing therefor, is an operating shaft or spindle 4 made angular in cross section at points designated respectively 5 and 6 for a purpose to be hereinafter fully disclosed. A suitable bevel gear 7 is mounted on said shaft 4, the gear 7 being in mesh with a like gear 8 mounted on a crank shaft 9 journaled in bearings 10 of the supporting plate 2, the handle 11 of the crank shaft being rotatable to provide for operation of the device. A comparatively large operating gear 12 is also mounted loose upon shaft 4, the said gear being in mesh with a pinion 13 in turn meshing with a like pinion 14, the respective pinions being mounted upon shafts or spindles 15 and 16 having associated therewith suitable beating devices designated respectively 17 and 18. Said devices 17 and 18 both rotate relatively to a plate 19 to which they are attached. The pinions 13 and 14 being in mesh, and but one of the said pinions being in mesh with the operating gear 12, it is apparent that the said beating devices 17 and 18 will simultaneously rotate, the rotation of one device however being in a direction opposite to the direction of rotation of the other.

An arm or slide 20 is mounted on shaft 4, the said arm being longitudinally slotted as indicated at 21, the respective longitudinal edges of the slot, when in the position indicated by the dotted lines in Fig. 3, being engaged with the angular portion 5 of the shaft. When in the position shown in full lines in the said Fig. 3, the shaft 4 may rotate without correspondingly rotating the slide.

To bodily move the beating devices 17 and 18 in the path of a circle, it is necessary that the operating gear 12 be locked against rotation. Therefore in order that the said gear may be thus locked, I provide a pin 22 mounted on the said gear, the pin being adapted for engagement with the slide 20 when the latter is so positioned relatively to the shaft 4 as to dispose the enlarged end of the slot 21 in the position shown in Fig. 3.

A second slide member 23 is mounted on the shaft 4 upon the under side of the gear 12, the said slide operating in conjunction with an arm 24 so disposed relatively to the spindle 16 of the beating device 18 to serve as a bearing therefor. A lug 25 is struck-up or formed upon the arm 24, the lug operating within a slot 26 of the slide member 23, whereby to cause said arm to move simultaneously with the slide should the latter be moved or set in the position shown in Fig. 5, the respective longitudinal edges of the slot 26 when in this position being engageable with the angular portion 6 of the shaft 4. When thus positioned, slide 23 is caused to rotate moving the arm 24 therewith, such movement causing gear 12 and arm 20 to be bodily moved until the lug 27 formed upon one end of the slide 20 engages an extension 28 of an adjustable stop element 29 arranged to slide longitudinally upon an arm 30 forming a part of supporting plate 2. The stop element being immovable laterally, and the lug 27 being engageable therewith, and with the pin 22, it is apparent that the gear 12 carrying the said pin is locked against rotation. When thus locked, continued rotation of slide 23 and arm 24 will cause the pinions 13 and 14 to rotate in opposite directions, at the same time bodily moving the beaters 17 and 18 in the path of a circle about the periphery of the said gar 12. As a means whereby slide 23 may be conveniently adjusted, a lip 31 is formed thereon.

When it is desired that the beating devices be oppositely rotated and at the same time held incapable of bodily movement, or stationary relatively to the supporting plate 2, the slide 23 is moved out of the position shown in Fig. 5 until the angular portion of the shaft 6 operates within the enlarged end of the slot 26 in the said slide. Stop element 29 is then moved into the position shown in Fig. 2 in which event, spindle 16 of beater 18 is adapted for engagement with the extension 28, such engagement locking the two beating devices against bodily movement in the path of a circle yet permitting, when the slide 20 is moved in the position indicated in dotted lines in Fig. 3, the gear 12 to be rotated to in this manner actuate the pinions 13 and 14 and rotate the beating devices 17 and 18 simultaneously and in opposite directions.

From the foregoing, taken in connection with the accompanying drawings it is apparent that the beating devices 17 and 18 may be operated to rotate in opposite directions, at the same time moving bodily in the path of a circle to beat or mix thoroughly the contents of the receptacle 1; that the said beating devices may be locked stationary or against bodily circular movement to operate in one position relatively to the container or receptacle 1, the said beating devices at the same time reversely rotating in the manner above disclosed; and that both operations of the beating devices are controlled through operation of the crank shaft 9, the latter serving as the operating means for the device.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention.

Having thus fully described my invention, what I claim as new and desire to secure by Letters Patent, is:—

1. In an egg beater, a rotatable element, means to rotate said element, means to move said element in the path of a circle while rotating, and means to lock said element against such circular movement.

2. In an egg beater, a pair of rotatable beating elements, means to move the elements bodily in the path of a circle while rotating, and means to lock said elements against such bodily movement.

3. In an egg beater, a pair of rotatable beating elements, means to rotate the elements in opposite directions, means to move the elements bodily in the path of a circle while rotating, and means to lock the said elements against such bodily movement.

4. In an egg beater, a pair of rotatable beating elements, an operating shaft, means mounted on said shaft to rotate the said elements in opposite directions, means mounted on the said shaft, to move the elements bodily in the path of a circle while rotating, and means to lock the said elements against such bodily movement while rotating.

5. In an egg beater, a pair of rotatable beating elements, an operating shaft, means including a member movable relatively to the shaft, said member being actuatable to move the elements bodily in the path of a circle while rotating, a second member movable relatively to the shaft, said second member being actuatable to lock the elements against bodily rotation.

6. In an egg beater, a pair of rotatable beating elements, an operating shaft, an operating gear loose upon said shaft, means mounted on the shaft to move the elements bodily in the path of a circle while rotating, means mounted on the shaft to render the opertaing gear immovable, and an adjustable stop element movable into and out of engagement with said last mentioned means, said element being engageable with one of the said beating devices to lock the said devices against bodily movement in the path of a circle without effecting rotation.

In testimony whereof I affix my signature in presence of two witnesses.

JAMES W. HUDSON.

Witnesses:
C. A. MARTINE,
EUGENE FRANCHE.